Figure 1:
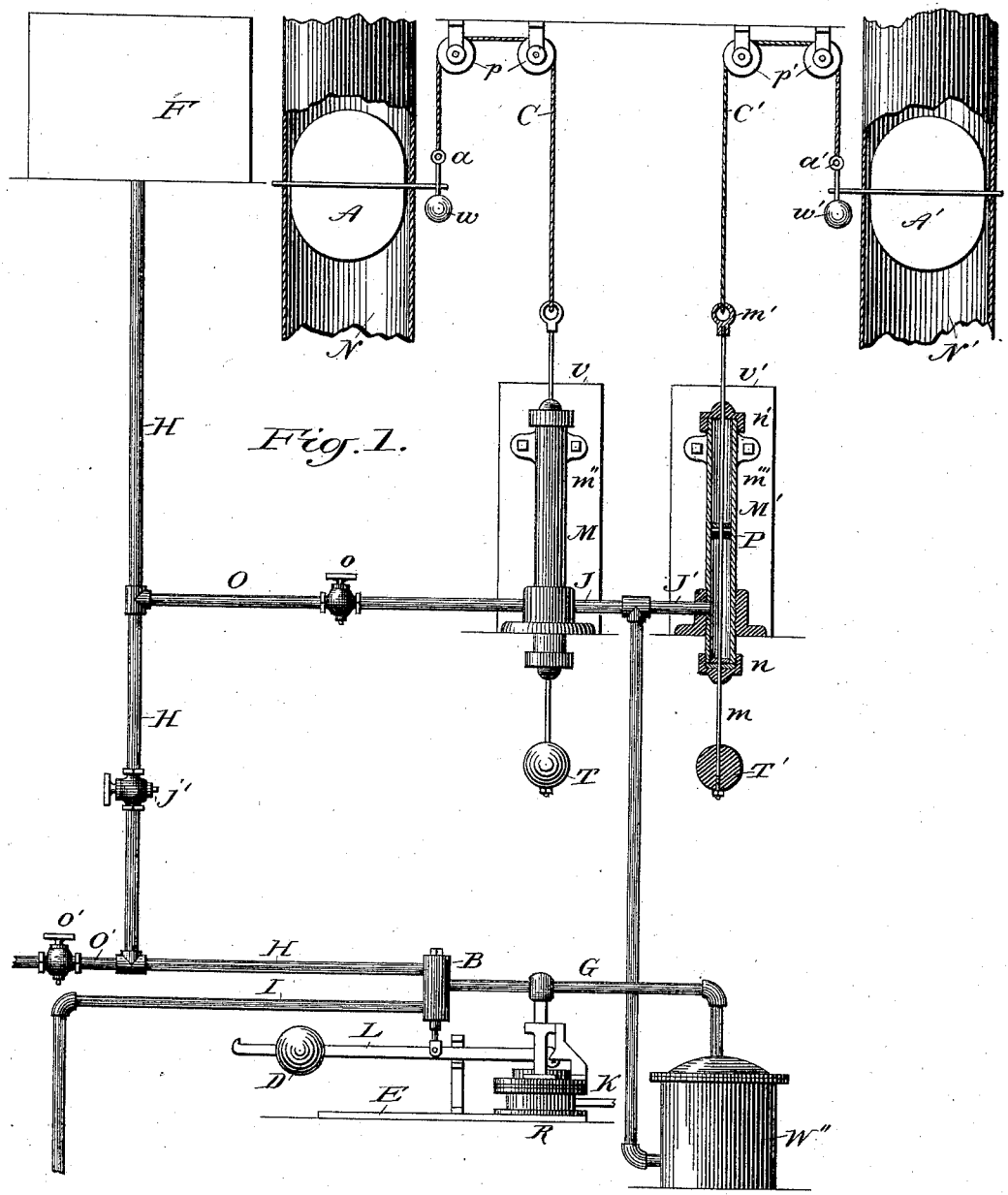

(No Model.)
2 Sheets—Sheet 1.

N. C. LOCKE.
DAMPER REGULATOR.

No. 335,080. Patented Jan. 26, 1886.

Witnesses.
B. R. Lockwood
E. Wynne Jones

Inventor.
Nathaniel C. Locke

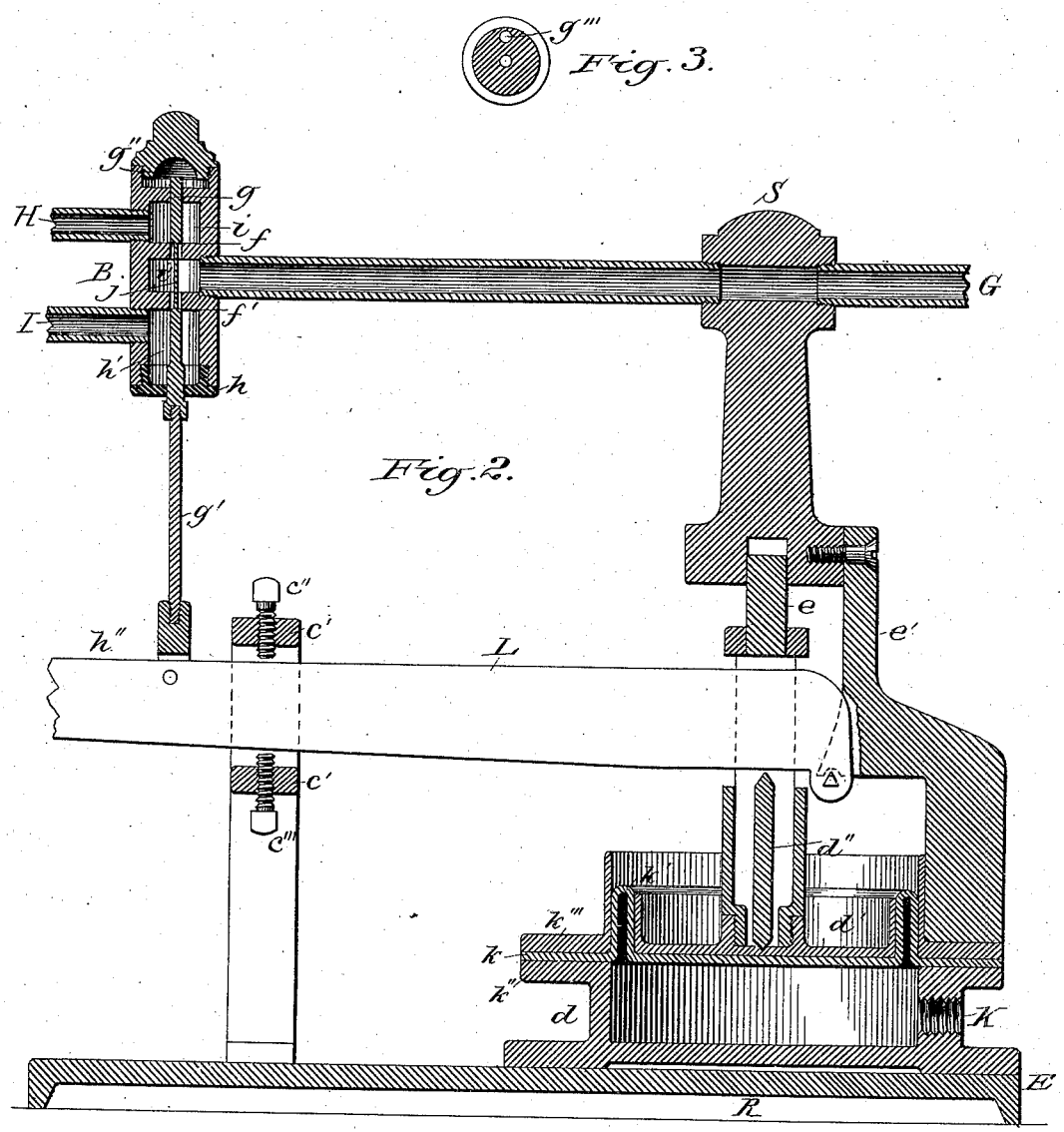

UNITED STATES PATENT OFFICE.

NATHANIEL C. LOCKE, OF SALEM, MASSACHUSETTS.

DAMPER-REGULATOR.

SPECIFICATION forming part of Letters Patent No. 335,080, dated January 26, 1886.

Application filed April 24, 1883. Serial No. 92,755. (No model.)

*To all whom it may concern:*

Be it known that I, NATHANIEL C. LOCKE, a citizen of the United States, residing at Salem, in the county of Essex and State of Massachusetts, have invented new and useful Improvements in Damper-Regulators, of which the following is a specification.

My invention relates to that class of automatic damper-regulators which have a motor with a movable piston connected with the damper for operating the same, and have a pipe leading to said motor in which is a valve for opening and closing the passage.

Heretofore steam was employed to operate the motor for controlling the damper, but this was objectionable, on account of fluctuations caused by the elasticity of the steam, and also on account of its leaving a deposit on the valve which controlled the passage to the motor, which obstructed its operation.

The object of my invention is to provide a regulator which shall possess the requisite power to move the heaviest dampers with the least possible variation of steam-pressure in the boilers; and it consists, first, in a damper-motor operated by fluid under pressure, the flow and exhaust whereof is controlled by a supplemental motor or regulator sensitive to variations of pressure in the generator; secondly, in a damper-motor actuated in one direction by fluid under pressure, and on exhaustion thereof moved in the other direction by a weight, the employment of water as a motive power admitted to the damper-operating motor through a suitable valve to be operated by the changing pressure of the steam in the boilers to be controlled, said steam-pressure acting upon a suitable motor with which said valve is connected; and, thirdly, in a peculiar construction of the said valve, and various other devices and details of construction to be hereinafter described. I attain these objects by the mechanism illustrated in the accompanying drawings, in which—

Figure 1 is a side elevation, partly sectional, of the apparatus embodying my invention. Fig. 2 is a vertical section of the valve and motor for controlling its operation. Fig. 3 is a horizontal section of valve.

It will be understood that the application of dampers and damper-motors shown in the drawings is not a part of the invention, but is merely to illustrate the fact that several dampers may be controlled by the same regulator.

Before describing in detail the apparatus shown in the drawings, which embodies my invention, I desire to point out in a general way the mechanical conditions under which these machines are required to operate, and the difficulties heretofore encountered, which are overcome by my invention. First, it is required to move the damper through an arc varying from forty-five to ninety degrees, or thereabout, and as the damper is frequently very heavy a considerable power and range of motion is necessary. At the same time it is necessary to control the application of this motor-power by an apparatus of great sensitiveness, and therefore of short range of motion. It is also preferable to employ for the damper-motor a practically non elastic fluid at a low temperature for these reasons: An elastic motor-fluid will not cease to act immediately upon the closing of the inlet-port, and its elasticity will also cause fluctuations, on account of unequal resistance at different points in the machine movement. These are substantial objections to the use of steam for a damper-motor, and they are entirely obviated by the use of water. The fluid should be cold or at a low temperature—say 70° Fahrenheit or below—because at a high temperature there is a greater tendency to deposit suspended mineral matters, and it is a matter of experience that delicate valves, which move slowly or intermittently, will soon be obstructed by such deposits where hot water is caused to pass through them. This tendency to deposit is increased by heating the water to boiling, and therefore water derived from the steam-generator is unsuitable. It is also a matter of experience that there is a deposit of oxide caused by the action of steam in the passage past the valve, whereby the action of the valve will be obstructed. For these reasons I prefer to employ a diaphragm-motor subjected to pressure from the generator having a very short range of motion, and with a corresponding sensitiveness. This motor acts upon and is counterpoised by the ordinary scale-beam lever with an adjustable weight. A balanced controlling-valve is coupled to said scale-beam, preferably at a distance from the motor-connection therewith, so that the motion of said motor will be multiplied at said valve. Said valve is placed in the pipe whereby fluid under pressure is conveyed from its source to the damper-motor, and controls the flow and exhaust thereof. By these means said damper-motor is actuated by a non-elastic pressure, and may have any desired range of motion to move the damper through any required arc, and may be actuated by any required power, because the pressure of the motor-fluid is entirely independent of the pressure maintained in the steam-generator; but notwithstanding it is preferable to employ cold water, the apparatus unchanged may be used with steam or with hot water derived from the generator, but with inferior results. Occasion to so use it may arise at any time by the temporary failure, from some cause, of the usual source of supply. Therefore I do not limit myself to the use of cold water; but, as required by law, I set that out as the preferable way.

Heretofore it has been customary to employ flat diaphragms, usually cut from rubber fabric, such as sheet-packing. It is a matter of experience that such diaphragms vary in sensitiveness inversely as the pressure; hence, while with small pressure such diaphragms will work satisfactorily, they are not sufficiently sensitive at high pressures. The exact reason I am unable to state; but I have discovered that by providing the diaphragm with a deep, annular corrugation or fold—such as shown in the drawings—so that the free parts of the diaphragm constitute two concentric parallel surfaces, with slight space between to be filled and lubricated by the motor-fluid, there is no variation in sensitiveness with variation in pressure.

Heretofore dampers have been coupled to automatic regulating devices, whereby the damper was moved in both directions by application of the motor force. I avoid the expenditure of one-half said force by effecting the return movement by means of a weight.

In Fig. 1 are shown two dampers and their motors operated by one valve and its controlling or supplemental motor.

N and N' are two flues, such as are used in connection with furnaces of steam-boilers. A and A' are dampers pivoted in said flues, having crank-arms $a$ and $a'$ and counterbalancing-weights W and W'.

M and M' are motors firmly fastened to vertical supports $v$ and $v'$, and having cylinders $m''$ and $m'''$.

F is a reservoir of water, representing a source of water-supply under pressure, which may be an aqueduct, the feed-pipe of the boiler, or other source of water under pressure.

In Fig. 1 motor M' is shown in section.

P is the piston, provided with water-tight packing and having rod $m$ extending above and below cylinder $m'''$.

$m'$ is an eye to which cord C, which passes over pulleys $p\ p$, is attached, the other end of cord C being made fast to crank-arm $a$.

Rod $m$ passes freely through a hole in cap $n'$ at the top of cylinder $m'''$, while at the lower end of cylinder $m'''$ the piston-rod $m$ plays through a stuffing-box, $n$.

Pipe H forms a connection between damper-motor M and some source of water-supply, such as an aqueduct, an elevated tank, or a pipe from a force-pump.

Piston P is arranged to be raised in cylinder $m'''$ by water under pressure admitted by valve B through pipe H from reservoir F, and to be returned downward by a weight, T, on the lower end of piston-rod $m$, where the water is allowed to escape. When thus relieved, piston P will descend until clasp $m^2$ rests upon the top of cap $n'$.

B is a piston-valve having chamber $i$, arranged to receive water under pressure through pipe H. From this chamber $i$ a passage is opened by the upward motion of piston $g'$ into chamber $i'$, from which pipe G communicates by means of pipes J and J' with motors M and M'. From chamber $i'$ the exhaust is allowed to escape by the downward motion of piston $g'$ into chamber $h'$, and passes off through pipe I. Chamber $g''$, at the top of valve B, is separated from high-pressure chamber $i'$ by diaphragm $g$, having an opening in its center, through which the upper end of piston $g'$ extends, fitting closely. An opening, $g'''$, (represented in Fig. 3,) is provided, through which any water which may pass into chamber $g''$ will fall into chamber $h'$. Thus, by preventing the high-pressure from acting upon the top end of piston $g'$, thus rendering the top like the bottom, which is open to the atmosphere, piston $g'$ is balanced.

$f$ and $f'$ are the ports of the valve B, through which piston $g'$ works, closely fitting the openings. A part of piston $g'$ is cut away and marked $j$. The length of this cut corresponds with the distance between ports $f$ and $f'$, so that an upward movement of piston $g'$ opens port $f$, and a downward movement opens port $f'$. The lower end of piston $g'$ extends through the bottom of the valve, and is connected with lever L of motor R by clasp $h''$. Set-screws $c''$ and $c'''$ in post $c'$ maintain piston $g'$ in its proper position for operation.

R is a motor (shown in section in Fig. 2) for the control of the valve B.

$d$ is the piston-chamber, resting on its base E, having piston $d'$ packed by diaphragm $k$. The diaphragm $k$ extends upward to the point $k'$ and returns to bottom of piston $d'$, and is held between its flanges $k''$ and $k'''$. Diaphragm $k$ is what is usually termed a "rolling" diaphragm, allowing piston $d'$ to move up and down with perfect freedom as acted upon by steam-pressure conveyed to chamber $d$ through pipe K. Piston $d'$ is loaded by means of lever L and weight D.

As hereinbefore described, lever L is attached to the piston $g'$ of valve B by means of clasp $h''$, and is limited in its movement by set-screws $c''$ and $c'''$. By attaching the piston of valve B at a distance from the center of piston $d'$ of motor R on the long end of lever L, and by the peculiar construction of valve B, I am enabled to effect all necessary changes in valve B by very slight movements of the piston $d'$ of the motor R. This fact is of special importance to my invention, as the more the piston $d'$ of motor R is required to move to control valve B the greater will be the variations of steam-pressure in the boiler required to produce such movement.

The mode of operation is as follows: All the attachments being made as shown, and the weight D on lever L being set to balance the same pressure per square inch under piston $d'$ that it is desired to maintain upon the steam-boiler, and cock $j'$ opened for the admission of water from tank F, and steam from the boiler being admitted to chamber $d$ of motor R by means of pipe K, the lever L will be held down by weight D, and thereby valve B will remain closed, allowing the pistons in motors M and M′ to remain down and dampers A and A′ open until the pressure in the boiler has reached the desired point, when it will be conveyed by means of pipe K′ to chamber $d$ of the motor R, and, acting upon piston $d'$, overcomes weight D, and raises lever L and piston $g'$ in valve B, opening port $f$ and allowing water under pressure from tank F through pipe H to pass along pipe G and through pipes J and J′ to motors M and M′, forcing pistons $m''$ and $m'''$ upward, slackening cords C and C′, and allowing weights W and W′ on crank-arms $a$ and $a'$ to close dampers A and A′, thus checking the draft and decreasing the pressure in the boiler. When the said boiler-pressure has fallen slightly, lever L will begin to fall by means of weight D communicating a downward motion to piston $g'$ of valve B, closing port $f$ and opening port $f'$, which allows the water which had been forced into the cylinders of motors M and M′ to flow back and to escape through port $f'$ to chamber $h'$, and off through pipe I, thus allowing the pistons P and P′ to be drawn downward by weights T and T′, and by means of cords C and C′ closing the dampers A and A′. If not convenient to procure water with sufficient pressure, steam may be admitted to valve B through pipe O′ into pipe H, which, in passing through valve B and pipe G, will create a pressure on water previously admitted to chamber W″. In this case the operation will be similar to that above described, with the exception that cock $j'$ in pipe H is closed and cock $o'$ in pipe O′ is opened. The pressure created by the steam thus admitted to vessel W″ will raise the water into the cylinders of motors M and M′, carrying up the pistons and allowing the dampers to open; and when by an increase of pressure in the boiler lever L is raised, closing port $f$ of valve B and opening port $f'$, the steam-pressure escapes through said port, and the water which had been forced up from vessel W″ falls back into the same, and the dampers are closed by the descending pistons in the motors M and M′.

It will be observed that vessel W″ is of service only when steam or hot water is used, as above described; but when cold water is employed in valve B and pipe G the vessel W″ may be dispensed with altogether.

Another method of operation is as follows: Cock $j'$ in pipe H being closed, and cock $o$ in pipe O being partially open, a very small and continuous flow of water is admitted directly under pistons $m''$ and $m'''$ through pipe O, and as long as port $f'$ of valve B remains open the water will pass off into waste-pipe I; but when by an excess of steam-pressure in the boiler lever L is raised and the flow of water through port $f$ arrested the pistons in motors M and M′ will be raised by an accumulation of pressure, and the dampers will close, and when reversed by falling off of pressure in the boiler, port $f$ in valve B will open and the water pass off into pipe I, as above described, and the dampers will again open.

Though valve B is described in connection with motor R for opening and closing the passage through pipe H, other valves may be used with more or less success. Therefore I do not propose to confine myself to the use of valve B, but may employ other valves, as convenience may suggest.

When it is necessary to operate several dampers to maintain the same pressure in several boilers at the same time, it may be effected, as herein shown, by applying a motor to each of the several dampers and operating all the motors by one supplemental motor and valve; or the same may be accomplished by connecting the several dampers to one motor, to be operated by motor and valve, as before.

I do not claim as new the operation of a steam damper and motor by an auxiliary valve placed in a line of pipe for the admission of steam to said motor when said valve has no mechanical auxiliary appliance attached thereto for operating the same independent of the steam-pressure acting directly upon the valve itself.

What I claim as my invention, and desire to secure by Letters Patent, is—

1. The combination, in a draft-regulating mechanism consisting of a damper and a motor for operating the same, and having a valve for controlling said motor, of the supplemental motor R, attached to said valve, having pipes G and K, and pipe H and reservoir F, all substantially as shown and described, and for the purpose specified.

2. The combination, with a damper and a motor for operating the same, of a supplemental motor having chamber $d$, loaded piston $d'$, and valve B, when said valve is connected for operation outside and beyond the center of said piston $d'$, as herein shown and described.

3. Damper-motor M, constructed as herein shown, having cylinder $m''$, piston P, with rod $m$, extending above, and having weight T, substantially as set forth, in combination with supplementary motor R, constructed substantially as herein shown and described.

4. In a draft-regulating device consisting of a damper, a valve, and a motor connected and operated as described, for operating said valve, of damper-operating motor M, constructed in the following manner: having cylinder $m''$, of sufficient length to allow piston P to rise and fall the full scope of the damper, having damper A, attached by a loose connection to piston-rod extending upward from the center of piston P, and having sufficient weight to open said damper, said weight adapted to move through the same space as piston P, substantially as shown and described.

5. In an automatic damper-regulator, a damper, a damper-motor connected with said damper to actuate and control the same, a source of water-supply under pressure, and a pipe connecting said supply with said motor, in combination with a valve in said supply-pipe, for controlling said damper-motor by controlling the water when being used as a motive power by being admitted to said motor under pressure and allowed to escape therefrom, said valve being connected with a steam-motor, whereby it is operated in accordance with the variations of boiler-pressure, substantially as shown and described.

6. In an automatic damper-regulator, a damper-motor having a cylinder and piston with a considerable range of motion, connected with the damper to control the same, a receptacle or source whence fluid is supplied under pressure, and a pipe connecting said source with said motor, combined with a regulating-valve in said pipe, to control the supply of said fluid, a steam-actuated motor of small range of motion, and means for connecting said motor with said valve, substantially for the purpose set forth.

7. In an automatic damper-regulator, in combination, a source of fluid-supply independent of the steam-generator, a damper-motor actuated by fluid under pressure drawn from said source, a regulating-valve to control said supply, and a motor connected with said generator and sensitive to variations of pressure therein, and with said valve to control the same by said steam-motor, whereby said motors are actuated by powers independent in source and pressure, but controlled in correspondence with fluctuations in the boiler-pressure, as set forth.

8. Valve B, constructed substantially as herein set forth, having a casing inclosing high-pressure chamber $i$ and central chamber, $i'$, with exhaust-chamber $h'$, and chamber $g''$, with diaphragm $g$, separating it from high-pressure chamber $i$, and having ports $f$ and $f'$, and having escape-passage $g'''$, with inlet-pipe H, outlet-pipe G, and exhaust-pipe I, and cylindrical piston $g'$, with a portion removed, all as shown, and for the purpose specified.

9. In an automatic damper-regulator, a source of fluid-supply and a damper-motor connected with the damper and with a source of fluid-supply, said damper-motor having a cylinder and a piston of considerable range of motion, combined with a regulating-valve, said valve connected to and operated by a steam-motor, whereby said fluid is admitted to actuate said damper-motor in one direction, and a weight to actuate said motor in an opposite direction when said fluid is exhausted, substantially as described.

10. The combination, with a damper and a motor for controlling the same and having a valve for operating said motor, of a supplemental motor having its movable piston resting upon a flexible diaphragm having the molded portion between said piston and the inside of chamber $d$ extend upward from the bottom of said piston and return to be clasped between flanges, substantially as set forth.

11. In an automatic damper-regulator having a damper and a damper-motor for controlling said damper, and a valve for controlling said motor, chamber $W''$, located in a line of pipe between said motor and said valve, substantially as shown and described, and for the purpose specified.

12. The combination, with a damper and a motor for operating the same, of a supplemental motor constructed in the following manner: having chamber $d$, loaded piston $d'$, and lever L, adapted to resist the force of steam-pressure acting upon piston $d'$, said lever L having a suitable valve-rod connecting lever L with pipe H and its valve, said valve-rod being connected with lever L at some distance from the point where piston $d'$ connects with lever L, substantially as shown, and for the purpose set forth in the accompanying specification.

13. The combination, with a damper and a motor for operating the same, provided with a valve for controlling its operation, of a supplemental motor for operating said valve when said valve and its motor are connected by a suitable pipe with a source of water-supply, substantially as shown and described.

14. In a damper-regulating device, the combination of three sub-combinations, the first of which is a steam-pressure motor of small range of motion, in combination with a device for multiplying the motion of the steam-motor, and with a valve actuated by the multiplied motion of the steam-motor; the second of which is the valve before referred to, serving to connect a water-way leading to a water-motor with either a source of supply under pressure or with an exhaust water-way, according to the position of the valve and the said water-way's source of supply under pressure and water-motor, and the third of which is the combination of the water-motor by suitable connections with the damper, all substantially as described.

NATHANIEL C. LOCKE.

Witnesses:
A. M. LEE,
CHARLES E. BURNS.